(12) United States Patent
Schultz

(10) Patent No.: US 11,897,771 B2
(45) Date of Patent: Feb. 13, 2024

(54) METHOD OF GRAPHENE EXFOLIATION AND/OR STABILIZATION AND COMPOSITION PREPARED THEREFROM

(71) Applicant: Turtle Wax, Inc., Addison, IL (US)

(72) Inventor: Michael A. Schultz, Homer Glen, IL (US)

(73) Assignee: TURTLE WAX, INC., Addison, IL (US)

( * ) Notice: Subject to any disclaimer, the term of this patent is extended or adjusted under 35 U.S.C. 154(b) by 69 days.

(21) Appl. No.: 17/741,696

(22) Filed: May 11, 2022

(65) Prior Publication Data

US 2022/0267155 A1 Aug. 25, 2022

Related U.S. Application Data

(62) Division of application No. 17/517,189, filed on Nov. 2, 2021, now Pat. No. 11,358,871.

(60) Provisional application No. 63/119,738, filed on Dec. 1, 2020.

(51) Int. Cl.
| | |
|---|---|
| *C01B 32/19* | (2017.01) |
| *C01B 32/194* | (2017.01) |
| *B82Y 30/00* | (2011.01) |
| *B82Y 40/00* | (2011.01) |

(52) U.S. Cl.
CPC ............ *C01B 32/19* (2017.08); *C01B 32/194* (2017.08); *B82Y 30/00* (2013.01); *B82Y 40/00* (2013.01); *C01B 2204/04* (2013.01); *C01B 2204/32* (2013.01); *C01P 2004/61* (2013.01); *C01P 2006/12* (2013.01)

(58) Field of Classification Search
CPC ... C01B 32/19; C01B 32/194; C01B 2204/04; C01B 2204/32; B82Y 30/00; B82Y 40/00; C01P 2004/61; C01P 2006/12; C08K 3/042
See application file for complete search history.

(56) References Cited

FOREIGN PATENT DOCUMENTS

WO 2015193268 12/2015

OTHER PUBLICATIONS

Huang, Ke-Jing, et al. "Ultra-trace determination of polycyclic aromatic hydrocarbons using solid-phase extraction coupled with HPLC based on graphene-functionalized silica gel composites." Analytical Methods 6.1 (2014): 194-201.*
Richards, Corey, Evan Baum, and Balaji Panchapakesan. "Silica Aerogels Doped with MWCNT, Graphene, MoS2, and WS2." (2016).*
Loche, Danilo, et al. "Incorporation of graphene into silica-based aerogels and application for water remediation." RSC advances 6.71 (2016): 66516-66523.*
Hassan, Kamrul, et al. "Functional inks and extrusion-based 3D printing of 2D materials: a review of current research and applications." Nanoscale 12.37 (2020): 19007-19042.*

* cited by examiner

*Primary Examiner* — Richard M Rump
(74) *Attorney, Agent, or Firm* — K&L Gates LLP

(57) ABSTRACT

The present disclosure provides a method of graphene exfoliation and/or stabilization. Both graphene and silica are mixed in an organic solvent to form a liquid precursor, which is then directed through an orifice formed by a metal cylinder and a flat metal plate. The metal cylinder is pressed against the flat metal plate by a high pressure. The high shear between the metal cylinder and the flat metal plate breaks down the thick layers of graphene to thin layers, which are stably dispersed in the gel formed by the silica.

16 Claims, 1 Drawing Sheet

METHOD OF GRAPHENE EXFOLIATION AND/OR STABILIZATION AND COMPOSITION PREPARED THEREFROM

PRIORITY CLAIM

This application is a divisional of U.S. patent application Ser. No. 17/517,189 filed Nov. 2, 2021, which claims priority to U.S. Provisional Patent Application Ser. No. 63/119,738 filed Dec. 1, 2020, which are incorporated by reference herein in their entirety.

BACKGROUND

This disclosure generally relates to graphene exfoliation and stabilization.

Graphite (FIG. 1) is a stack of graphene sheets bound by van der Waals interactions, each graphene layer being made of $sp^2$ carbons distributed in a hexagonal crystal structure. Graphene has shown superior mechanical, electrical, and thermal properties.

In "bottom-up" methods to produce graphene, for example, chemical vapor deposition (CVD), graphene is synthesized. In "top-down" methods, for example liquid-phase exfoliation, graphene sheets are separated from bulk graphite material (FIG. 1). The "bottom-up" approach produces low quantities with high quality and large flakes. The "top-down" approach using graphite is low in cost and yields a high concentration of suspended flakes, but fabricates limited-size sheets with a low yield of mono-layer graphene. Existing commercially available graphene products usually contains precipitates of graphene due to the presence of thick layers of graphene and are not stable.

SUMMARY

In a general embodiment, the present disclosure provides a method of graphene exfoliation and/or stabilization, the method comprising providing a liquid precursor comprising graphene and silica in an organic solvent and directing the liquid precursor through an orifice comprising a metal cylinder and a flat metal plate. The metal cylinder may be pressed against the flat metal plate, and the liquid precursor may be forced through an opening on the flat metal plate to a position between the metal cylinder and the flat metal plate.

In an embodiment, the metal cylinder may be pressed against the flat metal plate by a pressure of about 1500-6000 psi.

In an embodiment, the liquid precursor may be directed through the orifice by a pump.

In an embodiment, the silica may comprise fumed silica.

In an embodiment, the organic solvent may comprise a nonpolar petroleum distillate selected from the group consisting of light petroleum distillates (LPD) of $C_4$-$C_9$; medium petroleum distillates (MPD) of $C_8$-$C_{13}$, heavy petroleum distillates (HPD) of $C_8$-$C_{23}$, and mixtures thereof.

In an embodiment, the organic solvent may comprise a nonpolar organic oil with a carbon chain length of about 20 to about 50.

In an embodiment, the silica may form a gel comprising a three-dimensional structure.

In an embodiment, the liquid precursor may comprise the graphene with a first number of layers, and the directing of the liquid precursor though the orifice forms a composition comprising the graphene with a second number of layers, and the second number is less than the first number.

Another aspect of the present disclosure provides a composition prepared by the method disclosed herein, wherein the graphene is dispersed in the gel formed by the silica.

Another aspect of the present disclosure provides an automotive wax composition comprising the composition disclosed herein.

In an embodiment, this graphene/silica/nonpolar solvent additive blend can be added to a variety of car care products where benefits of graphene to modify surface protection/lubrication and other desired surface modifications can be achieved. An example of an automotive wax composition may comprise at least one of anionic surfactants, cationic surfactants, non-ionic surfactants, amphoteric surfactants, non-ionic emulsifiers, UV absorbers, mineral oil, butyl cellosolve, fragrances, colorants, preservatives, thickening agents, abrasive polishing agents, neutralizing agents, or stabilizing agents.

Additional features and advantages are described herein, and will be apparent from the following Detailed Description and the figures.

DETAILED DESCRIPTION

Figure 1:
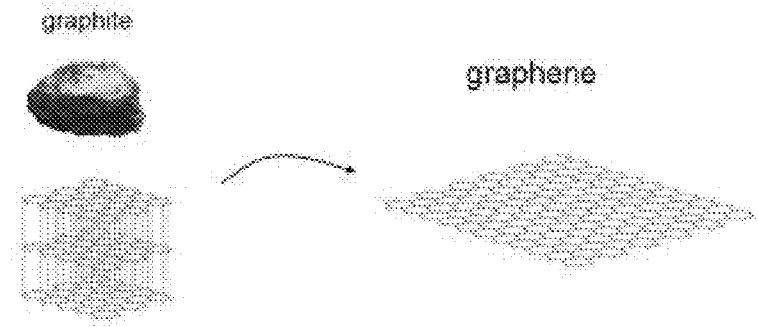
FIG. 1 shows graphene in relation to graphite.

All percentages are by weight of the total weight of the composition unless expressed otherwise. Similarly, all ratios are by weight unless expressed otherwise. When reference is made to the pH, values correspond to pH measured at 25° C. with standard equipment. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

An aspect of the present disclosure is a process using an organic solvent and silica under high pressure sheer force to create a liquid intermediate containing thin layers of graphene that allows for easy dispersion of graphene in a liquid organic solvent system. High sheer processing of graphene and silica together in a liquid organic solvent system result in stable graphene platelets. During the process, thick layers of graphene can break down to smaller layers of graphene that is more usable. The silica forms a gel simultaneously as graphene platelet multiple stacks are sheered into smaller platelet stacks through the organic solvent carrier. The small platelet stacks are dispersed in the gel and held by the network of the gel stably.

In the process, both a graphene raw material and silica are mixed in an organic solvent to form a liquid precursor. The graphene raw material can be water or oil based graphene. Preferably, the graphene raw material is a graphene powder. The graphene raw material may be obtained commercially. Commercially available graphene usually contains thick layers, e.g., more than 10 layers, of graphene. Thus, when commercially available graphene is used as an additive or is added to a liquid product, the commercially available graphene may precipitate in the liquid product.

The raw graphene powder can contain graphene nanoparticles consisting of stacks of graphene sheets having a platelet shape. The graphene particles may have an average thickness of about 6-8 nm and a typical surface area of about 120 to 150 m2/g. The graphene particles may have an average particle diameter of about 5-25 microns, such as 5, 15 or 25 microns.

Graphene nanoplatelets may have naturally occurring functional groups like ethers, carboxyls, or hydroxyls that can react with atmospheric humidity to form acids or other compounds. These functional groups are present on the edges of the particles and their wt % varies with particle size.

A non-limiting example of commercially available graphene that can be used is xGnP® graphene nanoplatelets.

The liquid precursor may be a suspension containing graphene solids.

The amount and/or concentration of the graphene raw material liquid precursor can depend on the desired amount, concentration, and/or use of the resultant product of the disclosed process.

A smaller distribution of graphene, for example, from about 0.05 wt % to about 50 wt % relative to the total weight of a liquid dispersion containing the graphene, would more easily disperse at the submicron level in the liquid dispersion, when compared to a greater wt % of graphene in the liquid dispersion. Smaller dispersions result in ease of addition of graphene to other desirable emulsions, for example, to enhance the uniform coating matrix for protection attributes graphene can provide to the coating.

A non-limiting example of the silica that can be used is fumed silica. Silica fume is an ultrafine powder collected as a by-product of the silicon and ferrosilicon alloy production. It may consist of amorphous (non-crystalline) spherical particles with an average particle diameter of about 100-200 nm, for example, about 150 nm, without the branching of the pyrogenic product. For example, CAB-O-SIL® TS-530 Fumed Silica can be used.

The concentration of silica, e.g., fumed silica, can be in the range of about 0.1 wt % to 20 wt % in the liquid precursor or any subrange thereof, for example, about 0.1-10 wt %, about 3-6 wt %, or about 4-6 wt %. A concentration of fumed silica in the range of about 0.1-20 wt % can modify nonpolar solvents to have a viscosity of higher than 100 saybolt seconds, e.g., to form ringing gels. For example, Aerosil® fumed silica can produce a ringing gel at a 5 wt % loading in a nonpolar solvent.

The organic solvent can be a petroleum solvent, aliphatic or aromatic. The organic solvent preferably has a viscosity of less than 100 Sabol seconds. Non-limiting examples include nonpolar organic solvents, such as nonpolar petroleum distillates, preferably light petroleum distillates (LPD) or similar nonpolar solvents that have normal alkanes in the range of $C_4$-$C_9$; medium petroleum distillates (MPD) falling within the range of $C_8$-$C_{13}$; or heavy petroleum distillates (HPD) $C_8$-$C_{23}$. The organic solvent can also be a nonpolar organic oil with a carbon chain length in the range of about 20 to about 50. The organic oil may have a boiling range of about 370° C. to about 600° C.

Non-limiting examples of organic solvents that can be used include, but are not limited to, mineral spirits, Stoddard solvent, petroleum distillates, aromatic 140, aromatic 100, rubber solvent, textile solvent, aromatic solvent, and aliphatic solvent.

Figure 2:
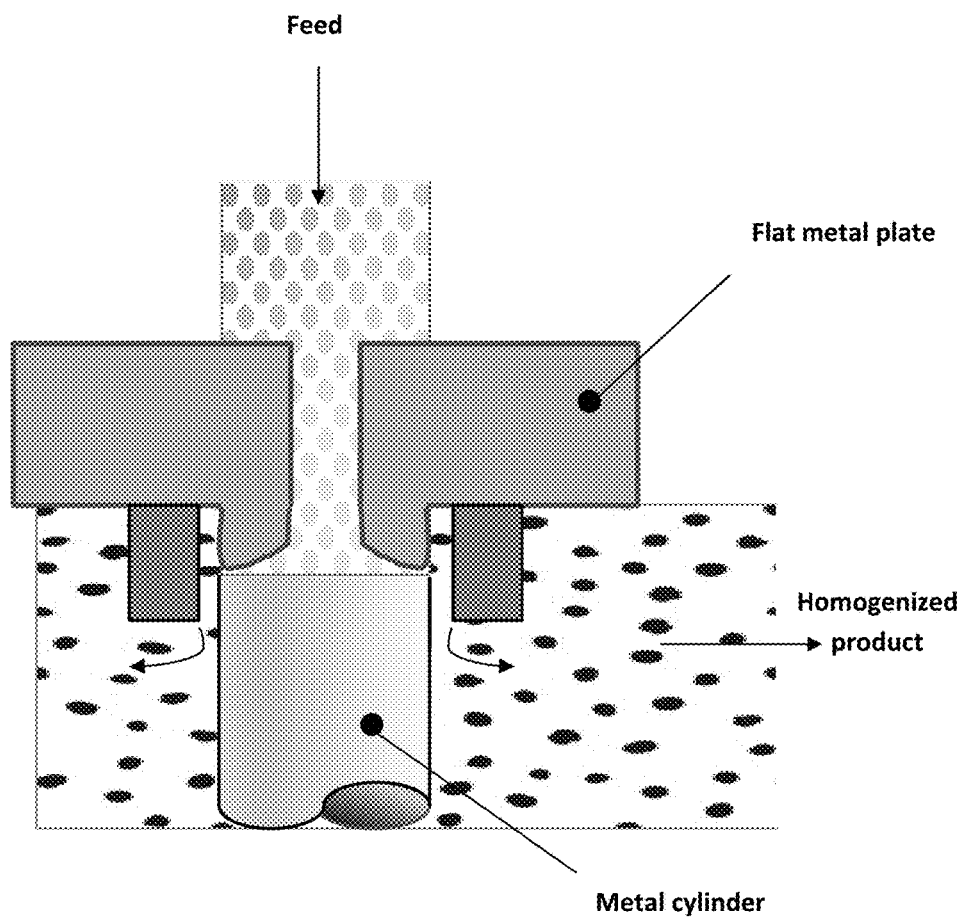
FIG. 2 shows one embodiment of the disclosed process.

In one embodiment as shown in FIG. 2, the liquid precursor containing the graphene and silica in the organic solvent may be directed through a restricted orifice formed by a metal cylinder and a flat metal plate. The liquid precursor may be directed through the orifice by a pump.

The metal cylinder may be pressed against the flat metal plate by an extreme pressure. The pressure applied on the metal cylinder may be in the range of about 1500-6000 psi. This high pressure ensures graphene sheers to a stable form in the resultant nonpolar liquid dispersion. A pressure of below about 1500 psi leads to a wider platelet particle size distribution curve and larger stacks of graphene platelets, which will settle in the non-polar dispersion.

The liquid precursor may be forced through an opening on the flat metal plate. The liquid precursor may then pass between the metal cylinder and the flat metal plate. The pumping pressure applied on the liquid precursor may be higher than the pressure between the metal plate and metal cylinder such that the feed of the liquid precursor can be directed through the opening and then between the metal cylinder and the flat metal plate.

When the liquid precursor passes between the metal cylinder and the flat metal plate, the thick layers of graphene may be broken into thin layers by the high shear pressure between the metal cylinder and the flat metal plate. The greater the pressure between the metal cylinder and the flat metal plate, the smaller the graphene platelet particle size.

When the liquid precursor is directed, e.g., forced by the pumping pressure, through the opening on the flat metal plate and between the metal cylinder and the flat metal plate, and then exits from between the metal cylinder and the flat metal plate, the pressure on the liquid precursor drops significantly. This pressure drop allows the liquid precursor to flow and homogenizes the pass-through liquid of the liquid precursor that contains thin layers of graphene such that the smaller graphene platelet particle are well dispersed in the resultant fluid product. The greater the pressure drop is, the greater the level of homogenization.

As a non-limiting example, this process may be conducted on a Gaulin Homogenizer.

The disclosed process thus reduces the particle size of the graphene and creates more uniform graphene platelets. In the resultant fluid product, at least about 90% of the graphene platelet particles have 10 layers or less of graphene.

In some embodiments, about 5-10% of the graphene platelet particles may still have more than 10 layers.

Further, when the liquid precursor passes between the metal cylinder and the flat metal plate, fumed silica undergoing sheer pressure may swell and expand in the nonpolar solvent to form a gel comprising a three-dimensional structure and with a higher rheology/viscosity than the organic solvent. The viscosity of the resultant silica gel can range from about 200,000 to about 600,000 centistokes.

The graphene platelet particles are dispersed in the three-dimensional network of the silica gel and held therein stably in the silica gel matrix. The organic solvent keeps the graphene particles apart from each other in the silica web, breaking up the Van der Waals forces between them, so that the graphene particles do not aggregate and maintain their thin layers of two-dimensional configuration.

The disclose process thus provides stabilization of the graphene platelet particles in a fluid dispersion. "Stabilization" used herein means substantially all of the graphene platelet particles are suspended, e.g., not settled or sedimented, after at least one month, preferably at least two months, more preferably at least six months, most preferably at least one year, at a temperature in the range of about −30 F to about 120 F, for example, at room temperature.

Another aspect of the present disclosure is a composition, such as a graphene suspension, produced by the disclosed process. The composition may comprises thin layers, e.g., up to 10 layers, of graphene suspended in the three-dimensional structure of a silica gel. The silica gel may be formed by a fumed silica swollen in a nonpolar organic solvent. The composition may have a viscosity ranging from about 200,000 to about 600,000 centistokes.

The composition produced by the disclosed process has a wide range of applications. The graphene suspension composition can also be used in spray painting, coatings, automotive wax, architectural coating, paint coating, etc. The graphene can be paint coating binders/additives and/or electrical conductors.

As discussed above, in the graphene suspension, the organic solvent keeps the graphene particles apart from each other in the silica web, breaking up the Van der Waals forces between them, so that the graphene particles do not aggregate and maintain their thin layers of two-dimensional configuration. When the graphene suspension additive is added to a product, such as a painting or coating, and when the product is applied on to a surface and allowed to dry, the organic solvent may evaporate, and upon evaporation of the solvent, the graphene nanoparticles can come together in the polymeric matrix of the silica gel and other components, thus strengthening the coating.

The extraordinary properties that graphene possesses can add interesting physical properties to types of coatings, paints, inks and more. For example, graphene's high resistivity can make for durable coatings that do not crack and are resistant to water and oil. Further, its excellent electrical and thermal conductivity can be used to make various conductive paints, and a strong barrier effect can contribute to extraordinary anti-oxidant, scratch-resistant and anti-UVA coatings. In car care products, graphene has thermal conductivity properties to dissipate heat or hot spots lessening water spotting.

As non-limiting examples, the graphene suspension composition can be added to paints and coatings, such as for radiators or other heat transfer/cooling systems, air conditioner coils, home, or automotive. The graphene can keep metals at uniform temperatures, provide the coatings with anti-wear benefits, friction modification, lubrication benefits, and/or scratch protection and/or reduction benefits.

Another aspect of the present disclosure is a automotive wax and/or coating comprising the graphene suspension produced by the disclosed process.

Additional anionic, cationic, non-ionic and/or amphoteric surfactants, as well as non-ionic emulsifiers, may be included in the automotive wax and/or coating.

Examples of anionic surfactants may include an alkylcarboxylate (soap), a polyalkoxycarboxylate, an N-acylsarcosinate, a linear alkylbenzenesulfonate (LAS), an alpha-olefin sulfonate (AOS), a dialkylsulfosuccinate, an alcohol sulfate, and/or an ethoxylated alcohol sulfate.

Examples of alkylcarboxylates (soaps) may include sodium, potassium or ammonium salts of $C_9$-$C_{21}$, fatty or rosin acids such as lauric acid, palmitic acid, stearic acid, coconut fatty acids, hydrogenated coconut fatty acids, oleic acid, and/or the like.

Examples of polyalkoxycarboxylates may include alkoxylated alcohols which have been end-capped with chloroacetate or acrylic acid. Polyalkoxycarboxylates may be produced by reaction of ethylene oxide, propylene oxide, or mixtures thereof, with an alcohol, to produce an alkoxylated alcohol having about 2 to about 50 moles of oxyalkylene groups per mole of alcohol, followed by reaction of the free hydroxyl end group of the alkoxylate with chloroacetate or acrylate.

Examples of N-acylsarcosinates may be amidocarboxylates produced by the reaction of a fatty acid or rosin acid chloride with sodium sarcosinate. Commercial examples include sodium N-cocoylsarcosinate, sodium N-laurylsarcosinate, sodium N-oleoylsarcosinate and the like.

Examples of commercial linear alkylbenzenesulfonates (LAS) may include alkali metal or ammonium salts of alkylbenzenesulfonic acids, wherein the alkyl substituent may be a linear $C_9$-$C_{13}$ alkyl group such as sodium dodecylbenzene sulfonate (SDS).

Examples of alpha-olefin sulfonates (AOS) may be products of sulfonation of alpha-olefins with sulfur trioxide and air, followed by neutralization of the intermediate sultones. Commercial examples include sulfonated $C_{10}$ to $C_{14}$ alpha-olefin, generally neutralized with an alkali metal hydroxide, an alkaline earth hydroxide, or an ammonium hydroxide.

Examples of dialkylsulfosuccinates may be alkali metal or ammonium salts of $C_5$-$C_{18}$ diesters of sulfosuccinic acid, such as sodium diamylsulfosuccinate, sodium dioctylsulfosuccinate, sodium di-(2-ethylhexyl)sulfosuccinate and/or the like.

Examples of commercial alcohol sulfates may include alkali metal, alkaline earth metal or ammonium salts of sulfate esters of $C_8$-$C_{12}$ alcohols such as sodium laurylsulfate, sodium 2-ethylhexylsulfate, lauryl triethanolammonium sulfate, sodium octylsulfate and/or the like.

Examples of ethoxylated alcohol sulfates may be alkali metal or ammonium salts of sulfate esters of $C_8$-$C_{18}$ alcohols ethoxylated with about 10 to about 40 weight percent of ethylene oxide, based on the weight of alcohol.

Examples of cationic emulsifiers may include an amine, an aliphatic or rosin amine ethoxylate, an amidoamine, and a quaternary ammonium salt. Amphoteric emulsifiers that exhibit cationic properties below a pH of about 7 may also be suitable for the present purposes and are included herein under the term "cationic emulsifier." Illustrative of such amphoteric emulsifiers are cocamidopropyl betaine, carboxyalkyl imidazolines, and/or the like.

Examples of amine cationic emulsifiers may include amines derived from fatty acids and rosins such as hydrogenated tallow amine, stearyl amine, lauryl amine, and the like, which are typically commercially available as acetate, oleate or naphthalenate salts. Other examples of amine cationic emulsifiers may include N-alkyltrimethyleneamines having the general formula R*NHCH$_2$CH$_2$CH$_2$NH$_2$, wherein R* is an alkyl group derived from natural oils such as coconut, tallow and soybean oils and the like; 2-alkylimidazolines, such as 2-heptadecylimidazoline, 2-heptadecenylimidazoline and the like; and/or 1-aminoethyl-2-alkyl imidazolines.

Examples of commercially available aliphatic and rosin amine ethoxylate cationic emulsifiers may include $C_6$-$C_{20}$ alkyl amines and rosin amines that have been ethoxylated with about 2 to about 50 moles of ethylene oxide per mole of amine, such as cocoamine, soyamine or stearylamine ethoxylated with 2 to 15 moles of ethylene oxide per mole of amine.

Examples of amidoamine cationic emulsifiers may include condensation products of fatty carboxylic acids with di- and polyamines, such as condensates of diethylenetriamine with stearic, oleic, coconut, or tall oil fatty acids, and/or the like.

Examples of quaternary amine cationic emulsifiers include dialkyldimethylammonium salts, such as dicocodimethylammonium chloride, distearyldimethylammonium chloride, and/or the like; alkylbenzyldimethylammonium chlorides such as cocobenzyldimethylammonium chloride, tallowbenzyldimethylammonium chloride, stearylbenzyldimethylammonium chloride and the like; and alkyltrimethylammonium salts such as cetyltrimethylammonium chloride, myristyltrimethylammonium bromide and/or the like; wherein the above alkyl groups are derived from fatty amines and rosin amines.

Examples of nonionic surfactants may include an alcohol alkoxylate, a polyol ester of a fatty acid, a polyoxyethylene ester of a fatty acid, a fatty acid amide, a polyoxyethylene fatty acid amide, a polyalkylene oxide block copolymer, an ethoxylated alkyl mercaptan, an ethoxylated anhydrosorbitol ester, and/or an alkyl polyglycoside. Further examples may include amine oxides prepared by hydrogen peroxide oxidation of tertiary aliphatic amines such as cetyldimethylamine oxide, stearyldimethylamine oxide, tallow-bis-(2-hydroxyethyl)amine oxide, stearyl-bis(2-hydroxyethyl) amine oxide, and/or the like.

Examples of alcohol alkoxylates may include ethoxylated $C_6$-$C_{18}$ linear and branched alcohols, ethoxylated with about 2 to about 80 moles of ethylene oxide, such as ethoxylated lauryl alcohol, ethoxylated stearyl alcohol, and ethoxylated mixtures of $C_6$-$C_{18}$ alcohols, and alkoxylated natural alcohols such as ethoxylated propoxylated pine oil, ethoxylated soya sterol, and/or the like.

Examples of polyol esters of fatty acids include saturated fatty acid monoglycerides, such as glycerol monolaurate, glycerol monococo ester, glycerol monotallow ester, glycerol monostearate, and/or the like; saturated fatty acid diglycerides, such as glycerol distearate, glycerol dilaurate and/or the like; unsaturated fatty acid monoglycerides, such as glycerol monooleate, glycerol monoricinoleate, and/or the like; unsaturated fatty acid diglycerides, such as glycerol dioleate, glycerol dilinoleate, and/or the like; glycol esters of fatty acids, such as propylene glycol monostearate, ethylene glycol monostearate, ethylene glycol monolaurate, diethylene glycol monooleate, diethylene glycol monostearate, and/or the like; and/or anhydrosorbitol fatty acid esters, such as mono, di and tri esters of 1,4-sorbitan with fatty acids such as stearic acid, palmitic acid and/or oleic acid.

Examples of polyoxyethylene esters of fatty acids may be polyethylene glycol mono- and di-esters of fatty acids comprising a polyethylene glycol portion having from about 5 to about 30 ethyleneoxy units, esterified at one or both ends with fatty acids such as stearic acid, lauric acid, oleic acid, and mixed fatty acids derived from natural oils such as coconut oil, castor oil, tall oil, and/or the like.

Examples of fatty acid amides may include diethanolamine fatty acid condensates such as coco diethanolamide, lauric diethanolamide, tall oil diethanolamide, and the like, and monoalkanolamine fatty acid condensates such as coco monoethanolamide, lauric monoethanolamide, stearic monoisopropanolamide, oleic monopropanolamide, and/or the like.

Examples of polyoxyethylene fatty acid amides may be ethoxylated mono and dialkanolamides having from about 2 to about 50 ethylene oxide groups, including ethoxylated lauric monoisopropanolamide, ethoxylated stearic diethanolamide, ethoxylated myristic monoethanolamide, ethoxylated oleic diethanolamide, and/or the like.

Examples of polyalkylene oxide block copolymers may include copolymers of ethylene oxide and propylene oxide initiated by ethylene glycol, propylene glycol, trimethylol propane, and the like, and have either linear or branched structures, depending on whether the initiator has two or three hydroxyl groups, respectively.

Examples of ethoxylated alkyl mercaptans may include linear or branched alkyl mercapatans such as dodecylmercaptan, ethoxylated with 2 to 10 moles of ethylene oxide per mole of mercaptan.

Examples of ethoxylated anhydrosorbitol esters may be mono, di and tri esters of 1,4-sorbitan with fatty acids such as stearic acid, palmitic acid and oleic acid that have been ethoxylated with about 4 to about 20 moles of ethylene oxide per mole of anhydrosorbitol ester.

Examples of alkyl polyglycosides may be glycosides (acetals) of $C_6$-$C_{20}$ alcohols with a monosaccharide such as glucose, fructose, lactose, mannose, xylose and the like or a polysaccharide or oligosaccharide such as isomaltose, maltose, cellobiose, mellobiose, maltotriose and/or the like.

Examples of non-ionic emulsifiers may include fatty acid alkanolamides such as coconut diethanolamide, soya diethanolamide, and/or the like.

Waxes suitable for use may include vegetable waxes such as carnauba, candelilla, and ouricury; mineral waxes such as montan, paraffin, and microcrystalline waxes; animal waxes, such as, beeswax; and/or synthetic waxes such as amide waxes and silicone waxes.

Other components that can be included may include UV absorbers such as benzotriazoles, benzophenones, and/or the like, polymeric UV absorbers having a UV chromophore attached to a polymer backbone, solvents such as mineral oil and butyl cellosolve, fragrances, colorants, preservatives, thickening agents, abrasive polishing agents such as silicas, zeolites, and the like, and neutralizing/stabilizing agents such as mineral acids or organic acids.

The automotive wax composition may be applied to a pre-wetted automobile exterior surface with a cloth, sponge or mitt. The composition can be diluted with water prior to application, if desired. After the automotive surface has been coated with the composition, the coated surface is dried and a translucent film is formed thereon. When the waxed surface is substantially dry, the waxed surface may be rinsed with water. This water rinse may substantially remove the anionic surfactant and any soil particles from the surface, as well as the formed translucent film, and may leave behind a protective film on the automotive surface. After rinsing, the automotive surface can be towel dried. A uniform and durable protective film is thus obtained, without the need for buffing or additional wiping away of excess polish generally required with conventional car wax applications.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A composition comprising graphene dispersed in a gel formed by silica, the composition prepared by a method comprising:
   providing a liquid precursor comprising both the graphene and the silica mixed in an organic solvent; and
   directing the liquid precursor through an orifice comprising a metal cylinder and a flat metal plate, wherein the metal cylinder is pressed against the flat metal plate, and the liquid precursor is directed through an opening on the flat metal plate to a position between the metal cylinder and the flat metal plate,
   wherein the composition has a viscosity of about 200,000 to about 600,000 centistokes.

2. The composition of claim 1, wherein at least 90% of the graphene has up to 10 layers.

3. The composition of claim 1, wherein the metal cylinder is pressed against the flat metal plate by a pressure of about 1500-6000 psi.

4. The composition of claim 1, wherein the liquid precursor is directed through the orifice by a pump.

5. The composition of claim 1, wherein the silica comprises fumed silica.

6. The composition of claim 1, wherein the organic solvent comprises a nonpolar petroleum distillate selected from the group consisting of light petroleum distillates (LPD) of C4-C9; medium petroleum distillates (MPD) of Cs-Cn, heavy petroleum distillates (HPD) of Cs-Cn, and mixtures thereof.

7. The composition of claim 1, wherein the organic solvent comprises a nonpolar organic oil with a carbon chain length of about 20 to about 50.

8. The composition of claim 1, wherein the gel formed by the silica comprises a three-dimensional structure.

9. The composition of claim 1, wherein the liquid precursor comprises the graphene with a first number of layers, and the composition comprises the graphene with a second number of layers, and the second number is less than the first number.

10. The composition of claim 9, wherein the first number is greater than 10, and the second number is 10 or less.

11. The composition of claim 1, wherein the liquid precursor comprises about 0.1 wt % to 20 wt % of the silica.

12. The composition of claim 1, wherein the liquid precursor comprises about 0.05 wt % to about 50 wt % of the graphene.

13. The composition of claim 1, wherein the graphene in the liquid precursor comprises graphene particles having an average thickness of about 6-8 nm and a typical surface area of about 120 to 150 $m^2/g$.

14. The composition of claim 1, wherein the graphene in the liquid precursor comprises particles having an average particle diameter of about 5-25 microns.

15. An automotive wax composition comprising a composition comprising graphene dispersed in a gel formed by silica, the composition prepared by a method comprising:
   providing a liquid precursor comprising both the graphene and the silica mixed in an organic solvent; and
   directing the liquid precursor through an orifice comprising a metal cylinder and a flat metal plate, wherein the metal cylinder is pressed against the flat metal plate, and the liquid precursor is directed through an opening on the flat metal plate to a position between the metal cylinder and the flat metal plate.

16. The automotive wax composition of claim 15 comprising at least one of anionic surfactants, cationic surfactants, non-ionic surfactants, amphoteric surfactants, non-10 mc emulsifiers, UV absorbers, mineral oil, butyl cellosolve, fragrances, colorants, preservatives, thickening agents, abrasive polishing agents, neutralizing agents, or stabilizing agents.

* * * * *